United States Patent
Hotta et al.

[15] 3,699,802
[45] Oct. 24, 1972

[54] CONDENSER LEAKAGE MONITORING SYSTEM

[72] Inventors: Takeshi Hotta; Hisashige Ishikawa, both of c/o Nikkiso Co., Ltd. No. 43-2, Ebisu 3-chome, Shibuya-ku, Tokyo, Japan

[22] Filed: Feb. 17, 1971

[21] Appl. No.: 116,024

[52] U.S. Cl............................73/40.5 R, 176/19 LD
[51] Int. Cl.........................G01m 3/18, G01m 3/22
[58] Field of Search..73/40, 405 R, 53, 61 R, 61.1 R, 73/422; 176/19 LD

[56] References Cited

UNITED STATES PATENTS 3,395,074   7/1968   Douet et al............176/19 LD

*Primary Examiner*—Louis R. Prince
*Attorney*—Young & Thompson

[57] ABSTRACT

A condenser leakage monitoring system for power plants including individual sampling path derived from each divided section of the condenser and a sealed cycle provided within a vacuum zone for recirculation of the sample after inspection. The sampling path is connected to an inlet valve which is in turn connected to a sealed or canned motor pump and the canned motor pump is further connected to the conductivity measuring cell which is electrically connected to a conductivity meter and also communicated to an outlet valve through a detecting electrode.

2 Claims, 2 Drawing Figures

PATENTED OCT 24 1972 3,699,802

INVENTOR
TAKESHI HOTTA
HISASHIGE ISHIKAWA

BY Young & Thompson
ATTORNEYS

CONDENSER LEAKAGE MONITORING SYSTEM

BACKGROUND OF THE INVENTION

The present invention relates to power plant water conditioning system and, more particularly, to condenser leakage monitoring system of the type wherein individual sampling path is derived from each desired parts of the condenser to inspect deterioration degree of the condensate providing a sealed cycle within a vacuum zone for recirculation of samples.

Generally in the power plants, inter alia, the nuclear power plant, majority of water supply is carried out by reuse of condensate which should always be conditioned pure. That is, the condensate must be protected from suffering deterioration for example due to inflow of cooling water such as sea water.

The inventors have developed an improved condenser leakage monitoring system for the thermal power plant wherein any generation and degree of leak of sea water are accurately detected by measurement of conductivity in such a way that a sealed cycle of the sample with a perfectly sealed or canned motor pump is connected to individual section of the condenser for sampling to inspect the deteriorated section of the condenser more accurately.

It has been appreciated that the above developed condenser leakage monitoring system may be effectively applicable to the condenser in the nuclear power plant. However, in the nuclear power plants, particularly, of the types such as enriched uranium reactor, water cooled reactor, water moderated reactor and boiling water reactor, the condensate has a possibility of suffering radioactive contamination which makes the operation as well as maintenance of the aforementioned monitoring system inconvenient.

In the nuclear power plant, the sampling region should be positioned possibly apart from the reactor to avoid radioactive influence, while the sealed or canned motor pump for sampling must be positioned possibly near the condenser on account of its characteristic such as the net positive suction head (NPSH). If, however, the canned motor pump is positioned near the condenser, the operator can not approach to inspect the motor pump when the accident arises due to radioactive influence or the necessity arises of repairing the pump due to abrasion of the bearing.

SUMMARY OF THE INVENTION

A general object of the invention is to obviate the above disadvantages and difficulties and to provide an improved condenser leakage monitoring system for power plants in which the sealed or canned motor pump is positioned near the condenser free from any repair for a certain period.

A further object is to provide a condenser leakage monitoring system for power plants which comprises individual sampling path derived from each divided section of the condenser and a sealed cycle provided within a vacuum zone for recirculation of the sample after inspection.

In accordance with the present invention, individual sampling path is derived from each divided section of the condenser and connected to an inlet valve which is in turn connected to a sealed or canned motor pump providing a sealed cycle of the sample. The canned motor pump is then connected to the conductivity measuring cell which is electrically connected to a conductivity meter and also communicated to an outlet valve through a detecting electrode.

Another object is to provide a condenser leakage monitoring system for power plants comprising individual sampling path derived from each divided section of the condenser and a sealed cycle provided within a vacuum zone for recirculation of the sample after inspection, wherein said individual sampling path is connected in series to a circuit comprising an inlet valve, a canned motor pump and an outlet valve, said circuit being further connected in parallel to one or more additional circuits comprising an inlet valve, a canned motor pump and an outlet valve, providing a circuit for switching valve and starting or stopping the canned motor pump through a relay means in accordance with the predetermined operation period or tolerable limit of the bearing abrasion thereby automatically switching the canned motor pump in order.

Other objects and advantages of the present invention will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

Figure 1:
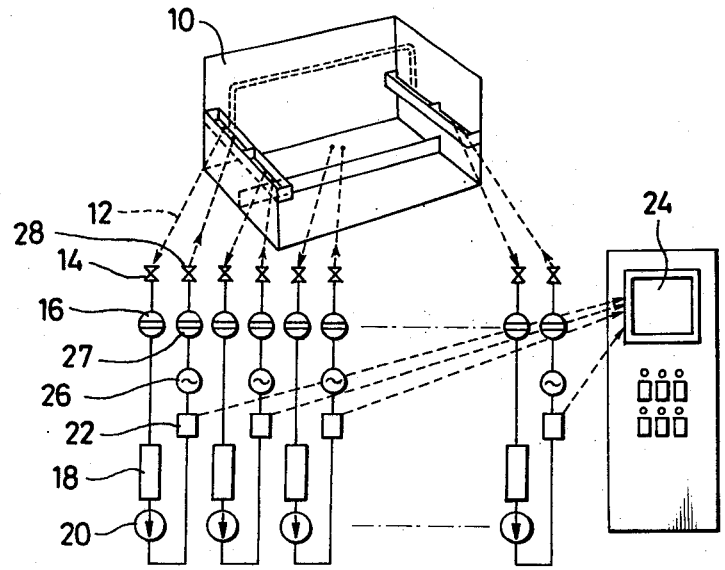
FIG. 1 is a diagrammatical view of the condenser leakage monitoring system in accordance with the invention.

DESCRIPTION OF THE PREFERRED EMBODIMENT:

In an embodiment shown in FIG. 1, the reference numeral 10 designates a condenser from the desired sections of which individual sampling path 12 is derived. The sampling path 12 is connected to an inlet valve 14 which is in turn connected in series from a strainer 16 through a cation exchange column 18 to a vacuum non-leak canned motor pump 20. The canned motor pump 20 is further connected to a conductivity measuring cell 22 which is electrically connected to a conductivity meter 24 and communicated through a flow gage 26 and a strainer 27 to an outlet valve 28 for recirculation of the sample thereby providing a sealed cycle of the sample within a vacuum zone. When the deterioration of the sample is to be inspected, removal or demineralization of the deteriorated water in the condenser is carried out automatically by an actuation of the relay.

Figure 2:
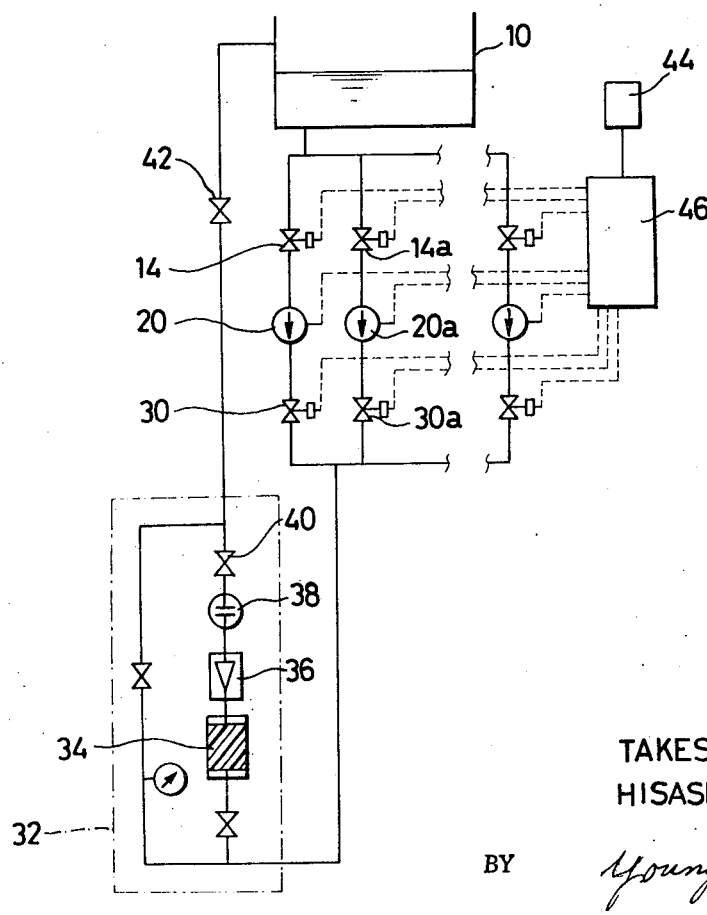
FIG. 2 is a diagrammatical view of the condenser leakage monitoring system of another embodiment.

In another embodiment shown in FIG. 2, individual sampling path 12 is derived from each divided section of the condenser 10 and then connected to a sealed cycle of the sample for recirculation as illustrated in connection with the embodiment shown in FIG. 1.

The sample flows passing through the inlet valve 14, a canned motor pump 20 and an outlet valve 30 into a measuring section 32 wherein the sample is permeated through a cation resin mass 34 to substitute a small amount of salt contained in the condensate thereby amplifying the conductivity.

The sample further flows through a flow meter 36 and an electrode 38 wherein an electrolytic conductivity is measured to detect the deterioration of the condensate and the sample is finally refluxed through valves 40 and 42 into the condenser 10.

The measuring section 32 is positioned apart from the condenser 10, while the canned motor pump 20 is positioned near the condenser 10. The canned motor pump 20 provides an impeller in the same shaft as the rotor and said common shaft is carried by the bearing which usually reaches the tolerable limit after about 5,000 to 8,000 hours. When the bearing life comes to cessation, the operation should be stopped immediately. Accordingly, the necessity arises of operating another additional pump until the next periodical inspection of the first pump.

In accordance with the present invention, two or more circuits comprising the inlet valve, the sealed pump and the outlet pump are connected selectively in parallel.

In starting the operation, a starting switch 44 is put on to open inlet and outlet solenoid valves 14 and 30 while closing simultaneously a limit switch contact for indication of the valve opening. Further, a relay of control box 46 is actuated to close a pump relay contact thereby starting the pump while energizing simultaneously a time-set integrating meter (not shown) through the relay to integrate the operation period of the pump and to detect the bearing abrasion by means of an abrasion detector (not shown) providing the tolerable limit of the bearing.

When the predetermined operation period passed or the bearing abrasion gets over a certain tolerable limit, a signal is brought to stop the operation of the pump 20 and to close the valves 14 and 30 while opening simultaneously the valves 14a and 30a to start the pump 20a thus switching into another pump circuit. In this way, the pump circuit may be switched successively in accordance with the bearing abrasion until the next periodical inspection of the pump.

According to the invention, the pump on operation may be switched instantaneously without necessitating any artificial repair or maintenance by the operator within a certain period.

We claim:

1. A condenser-leakage monitoring system for power plants which comprises an individual sampling path derived from each divided section of the condenser and a sealed cycle formed within a vacuum zone for recirculation of the sample after inspection, said individual sampling path being derived from each divided section of the condenser and connected to an inlet valve which is in turn connected to a canned motor pump which is further connected to a conductivity measuring cell, said conductivity measuring cell including a detecting electrode and further being electrically connected to a conductivity meter and also through an outlet valve back into the respective section of the condenser.

2. A condenser-leakage monitoring system for power plants which comprises an individual sampling path derived from each divided section of the condenser and a sealed cycle formed within a vacuum zone for recirculation of the sample after inspection, said individual sampling path being connected in series to a fluid circuit comprising an inlet valve, a canned motor pump, a testing cell and an outlet valve, said circuit being further connected in parallel to at least one additional fluid circuit comprising an inlet valve, a canned motor pump, a testing cell and an outlet valve, electrical circuit means for opening and closing said valves and for starting and stopping the canned motor pump in each fluid circuit, and means responsive to a predetermined operation period or tolerable limit of the bearing abrasion of the canned motor pump in the first-mentioned fluid circuit for automatically closing the valves in the first mentioned fluid circuit and stopping the motor therein and for opening the valves and starting the motor in said additional fluid circuit.

* * * * *